Patented Sept. 8, 1942

2,294,938

UNITED STATES PATENT OFFICE 2,294,938

OXYGENATED ESTROGENIC HORMONES AND METHOD OF PREPARING SAME

Erwin Schwenk, Montclair, N. J., assignor to Schering Corporation, Bloomfield, N. J., a corporation of New Jersey No Drawing. Application May 13, 1939, Serial No. 273,416

18 Claims. (Cl. 260—397.4)

The present invention relates to the production of oxygenated derivatives of estrogenic hormones and of their ester, ether, halogen and other substitution products.

I have found that under certain conditions it is possible to obtain definite oxidation products of the estrogenic hormones other than acids, and in which the nucleus is unbroken, especially if the hydroxyl group or groups in the molecule are protected by esterification, etherification or by substitution by halogen, or are in general converted into any non-oxidizable group which can be replaced by the hydroxyl group with the aid of hydrolysis. It is, however, not absolutely essential that the hydroxyl groups be protected against oxidation, although better yields will in general be obtained if they are temporarily replaced by a non-oxidizable group. It is important that the oxidation be carried out either with mild agents, or with relatively strong oxidizing agents but under otherwise mild conditions, as at room temperature. In this way new compounds are obtained which contain in the molecule an additional oxygen atom, the latter being in the B ring and apparently occupying the 6-position. Tested in the usual way on animals, these compounds show a considerable physiological activity and are also suitable for the manufacture of other physiologically active compounds, especially of the hormone series. Thus equilin and equilenin and their derivatives may be prepared from estrone, as by reduction of the introduced ketonic oxygen followed by the splitting off of water, with resulting formation of an additional double bond or bonds in ring B.

The oxidizing agents may be of various types including the oxidizing compounds of hexavalent chromium, such as chromic acid or anhydride, and also potassium permanganate, hydrogen peroxide, perbenzoic acid, and other oxidizing agents commonly employed in limited oxidizing reactions involving cyclopentanopolyhydrophenanthrene compounds. It is, however, important that the conditions be so controlled that the oxidation is relatively slow and mild. Thus it is desirable, for good yields, that the temperature does not exceed about 25° C. and it may generally be somewhat below this value.

As starting materials, there may be employed not only the follicular hormones themselves, particularly equilin and estrone, in which the hydroxyl group has preferably been protected, as above described, but also the derivatives of these hormones, such as the partially hydrogenated derivatives, for example, estradiol and estriol.

The invention will be described more in detail with the aid of the following examples, which are presented for purposes of illustration only and not as indicating the limits of the invention:

Example 1

2.8 grams of estrone acetate were dissolved in 20 cc. of glacial acetic acid, and 3 grams of chromic acid, which had previously been dissolved in the least amount of water capable of dissolving it and then diluted with several cc. of glacial acetic acid, were added thereto. The total volume was 30 cc. This solution stood at room temperature overnight and the next morning showed a slightly greenish coloration. Several cc. of methyl alcohol were added to decompose the unreacted chromic acid and the mixture was then diluted with ice and water and thoroughly extracted with ether. The ether residue was treated in the usual way, finally dried and evaporated. The residue was crystallized from acetone. Big column-like crystals separated out after standing in the ice box overnight. The mother liquor was evaporated to half the volume and then gave another yield of crystals. The first batch of crystals was recrystallized several times from dilute acetone and finally showed a melting point far higher than the starting material, namely 193.5-195.5°. The analysis of this product gave the following result: 3.478 mgm. gave 2.250 mgm. $H_2O$ and 9.270 mgm. $CO_2$. Found 7.24% H, 72.69% C; calculated 6.74% H, 73.6% C for 6-keto-estrone acetate.

Example 2

8.7 grams of alpha estradiol diacetate (2.45 mM.) were dissolved in 30 cc. of glacial acetic acid. A solution of 7.35 grams of chromic anhydride (7.35 mM.) in 50 cc. of 90% acetic acid was added. The mixture was allowed to stand for 24 hours at room temperature and then precipitated with ice water. The reaction products were then separated into acidic and neutral fractions by treatment with aqueous NaOH and extraction with ether. From the neutral fraction there was isolated with Girard's reagent

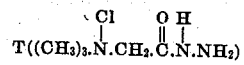

a non-ketonic fraction, which consisted mainly of the starting material, whereas the ketonic fraction, 2.0 grams, crystallized immediately. After several recrystallizations from 90% alcohol, the substance melted at 173-175° (corr.).

The analysis gave results in accordance with the formula $C_{22}H_{28}O_5$ corresponding to the structural formula

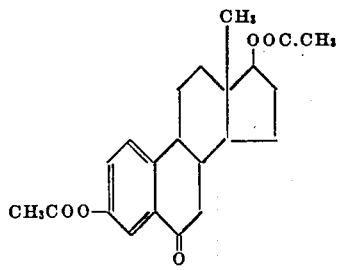

Ultraviolet spectrum: Maxima at 250 m$\mu$($\epsilon$: 8800) and 300 m$\mu$($\epsilon$: 1800).

Hydrolysis with methanolic KOH at room temperature yielded 6-keto estradiol, melting point 282–283° (corr.). $(\alpha)^{23}_D = +4.2$ (0.7% in absolute alcohol).

Absorption spectrum: Maxima at 256 m$\mu$($\epsilon$: 8100) and 327 m$\mu$($\epsilon$: 3050).

Semicarbazone: Decomposes with gas evolution above 280°.

Acetylation with acetic anhydride yielded the diacetate, M. P. 175°. The compound gives with concentrated $H_2SO_4$ a greenish-yellow color without fluorescence and combines with p-nitro-diazobenzene in alkaline solution to give a red dyestuff. In the biological test on the rat, 6-keto-estradiol was found to be three times as potent as estrone.

Reduction of the diacetate (149 mgm.) with aluminum-iso-propylate and subsequent saponification failed to give a crystallizable product. The fraction was reacetylated, yielding 150 mgm. of a product which was for the most part crystalline. After four recrystallizations an apparently homogeneous compound, melting at 172–177.5° (corr.), was obtained, which analyzed correctly for the triacetate of an estriol. This product was identical with the reacetylated reduction product of the substance obtained according to Example 1.

Analysis: Found C 69.72, H 7.22. Calculated for $C_{24}H_{30}O_6$, C 69.53, H 7.30.

The absorption spectrum is similar to that of estradiol diacetate, maxima at 269 m$\mu$ ($\epsilon$:740) and 276 m$\mu$ ($\epsilon$:660).

*Example 3*

5 grams of estrone methyl ether are dissolved in 100 cc. of acetone, and the equivalent of 5 oxygens of potassium permanganate in finely powdered form is added in small portions under very good stirring. The temperature is kept at about 18° C. After the addition is finished, the reaction is completed by stirring for two hours. Then the reaction mixture is poured into water and so much sodium bisulfite solution added that all permanganate is decomposed and the $MnO_2$ dissolved. The white precipitate is now filtered and thoroughly washed with water and then recrystallized. The substance obtained is identical with the methyl ether of 6-keto-estrone and identical with the substance obtained by the methylation of the saponified reaction product of Example 1.

When in the above examples the acetate is described as constituting the starting material or as being formed by esterification, the corresponding propionate, butyrate, valerate, benzoate and other esters may be employed or formed, and likewise the halides and ethers. Mixed esters, mixed ethers, and also ether-esters, halide-esters and halide-ethers may be produced by methods in themselves known.

I claim:

1. The method of producing oxygenated derivatives of 13-methyl-cyclopentano-polyhydrophenanthrene compounds unsaturated in ring A, which comprises subjecting a 13-methyl-cyclopentano-polyhydrophenanthrene compound unsaturated in ring A to mild oxidizing conditions whereby ketonic oxygen is added in ring B, and recovering the keto compound so produced.

2. The method according to claim 1 wherein the starting material is subjected to the action of an oxidizing compound of chromium at approximately room temperature.

3. The method of producing ketonic derivatives of estrogenic substances which comprises subjecting a member of the group consisting of equilin, estrone, estradiol, estriol, and their derivatives in which their hydroxyl groups are replaced by groups which with the aid of hydrolysis can in turn be replaced by the hydroxyl group, to mild oxidizing conditions whereby ketonic oxygen is added in ring B, and recovering the keto compound so produced.

4. The method according to claim 3 wherein the oxidation is carried out at temperatures not substantially higher than room temperature.

5. The method according to claim 3, wherein the oxidation is carried out at temperatures not substantially higher than room temperature, and the oxidizing agent is a member of the group consisting of oxidizing compounds of hexavalent chromium, permanganates, hydrogen peroxide, and perbenzoic acid.

6. The method of producing an oxygenated derivative of a female sex hormone which comprises reacting an ester of estrone with chromic acid at approximately room temperature, decomposing excess chromic acid, adding water to the mixture and extracting the same with a water non-miscible organic solvent, and recovering the oxygenated reaction product.

7. The method of producing an oxygenated derivative of an estrogenic hormone which comprises reacting a 3,17-diester of alpha estradiol with chromic acid to effect introduction of oxygen into the molecule while leaving the nucleus intact, separating the reaction product into acidic and neutral fractions, and recovering the oxygenated derivative from the neutral fraction.

8. In a process for the production of oxygenated derivatives of estrogenic hormones, the step which comprises subjecting an estrogenic hormone of the 13-methyl-cyclopentano-polyhydrophenanthrene series to a mild oxidizing reaction whereby oxygen is added to the molecule while the nucleus remains intact.

9. A 13-methyl-cyclopentano-polyhydrophenanthrene compound having a benzenoid A ring and a keto group in the B ring.

10. A 6-keto-derivative of a member of the group consisting of estrogenic hormones and their derivatives in which the hydroxyls are replaced with groups convertible with the aid of hydrolysis into hydroxyls.

11. A 6-keto derivative of a member of the group consisting of estrone, estradiol, estriol and their substitution products wherein a hydroxyl group is replaced by a group which with the aid of hydrolysis can in turn be replaced by the hydroxyl group.

12. A compound having a composition corresponding to the formula

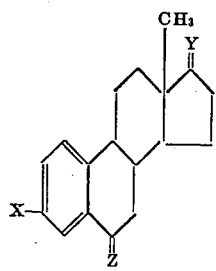

wherein X is a member of the group consisting of the hydroxy group and groups that with the aid of hydrolysis can be replaced with the hydroxy group, and Y and Z are the same or different members of the group consisting of =O and

wherein X is as above defined.

13. 3–X–6–keto-estrone wherein X is a member of the group consisting of the hydroxy group and groups that with the aid of hydrolysis can be replaced with the hydroxy group.

14. 3–X–6–keto–17–X–estradiol wherein X is a member of the group consisting of the hydroxy group and groups that with the aid of hydrolysis can be replaced with the hydroxy group.

15. The 6-keto derivatives of estrone acetate having a melting point of about 193.5–195.5° C.

16. The 6-keto derivative of alpha estradiol diacetate of the formula $C_{22}H_{26}O_5$ melting at about 173–175° C. (corr.).

17. 6-keto-estradiol having a melting point of about 282–283° C. (corr.), yielding on acetylation the diacetate of melting point 175° C., and giving with concentrated sulfuric acid a greenish-yellow color without fluorescence and combining with p-nitro-diazobenzene in alkaline solution to a red substance.

18. A 3–X–17–Y–13–methyl-cyclopentano-polyhydro-phenanthrene compound whose A ring is benzenoid, X being a member of the group consisting of the hydroxy group and groups that, with the aid of hydrolysis, can be replaced with the hydroxy group, a group Z being attached to the B ring at the 6-position, and Y and Z being members of the group consisting of =O and

wherein X is as above defined.

ERWIN SCHWENK.